US009762864B2

(12) United States Patent
Norland et al.

(10) Patent No.: US 9,762,864 B2
(45) Date of Patent: Sep. 12, 2017

(54) SYSTEM AND METHOD FOR MONITORING AT LEAST ONE OBSERVATION AREA

(71) Applicant: Kongsberg Defence & Aerospace AS, Kongsberg (NO)

(72) Inventors: Magne Norland, Skedsmokorset (NO); Kjell Arne Hellum, Skedsmokorset (NO); Jorn Are Henriksen, Langhus (NO); Jan Ove Larsen, Lillestrom (NO); Glenn Levi Nilssen, Oslo (NO); Roar Johnsen, Fjerdingby (NO); Steinar Lind, Nittedal (NO); Oyvind Overrein, Strommen (NO); Vegard Almas, Oslo (NO); Per Inge Jensen, Skjetten (NO); Claus Fritzner, Hagan (NO); Bjorn Olav Bakka, Oslo (NO); Eirik Joakim Steinli, Kongsberg (NO); Thor Christian Helgerud, Kongsberg (NO)

(73) Assignee: KONGSBERG DEFENCE & AEROSPACE AS, Kongsberg (NO)

( * ) Notice: Subject to any disclaimer, the term of this patent is extended or adjusted under 35 U.S.C. 154(b) by 330 days.

(21) Appl. No.: 14/096,192

(22) Filed: Dec. 4, 2013

(65) Prior Publication Data
US 2014/0160235 A1    Jun. 12, 2014

(30) Foreign Application Priority Data
Dec. 7, 2012    (NO) .................................. 20121477

(51) Int. Cl.
*H04N 7/18*    (2006.01)
*H04N 5/232*    (2006.01)
(Continued)

(52) U.S. Cl.
CPC ......... *H04N 7/18* (2013.01); *G08B 13/19643* (2013.01); *H04N 7/181* (2013.01);
(Continued)

(58) Field of Classification Search
CPC ............................. H04N 7/18; H04N 5/23238
See application file for complete search history.

(56) References Cited

U.S. PATENT DOCUMENTS

| 5,790,183 A | 8/1998 | Kerbyson |
| 2006/0238617 A1* | 10/2006 | Tamir .................. G08B 13/196 348/143 |

(Continued)

OTHER PUBLICATIONS

NO Search Report, dated Jul. 4, 2013, from corresponding NO application.
(Continued)

*Primary Examiner* — Nam Pham
(74) *Attorney, Agent, or Firm* — Young & Thompson

(57) ABSTRACT

System for monitoring at least one observation area including at least one camera for providing panorama pictures of the at least one area, where the camera is arranges on a rotating platform in the at least one area to be monitored; at least one video camera for providing real time video and which is arranged on a stationary platform in the at least one area to be monitored; a processing device connected to the camera and the video camera for capturing, processing and coordinating signals.

28 Claims, 3 Drawing Sheets

(51) Int. Cl.
G08B 13/196 (2006.01)
H04N 5/247 (2006.01)
H04N 5/33 (2006.01)

(52) U.S. Cl.
CPC .. *G08B 13/19628* (2013.01); *G08B 13/19693* (2013.01); *H04N 5/23238* (2013.01); *H04N 5/247* (2013.01); *H04N 5/332* (2013.01)

(56) References Cited

U.S. PATENT DOCUMENTS

| | | |
|---|---|---|
| 2008/0117294 A1 | 5/2008 | McCutchen |
| 2011/0310219 A1 | 12/2011 | Kim et al. |
| 2012/0062695 A1* | 3/2012 | Sakaki ............ G08B 13/19691 348/36 |
| 2012/0098927 A1 | 4/2012 | Sablak |
| 2012/0257064 A1 | 10/2012 | Kim et al. |
| 2013/0094682 A1* | 4/2013 | Lee ........................ G02B 27/01 381/306 |

OTHER PUBLICATIONS

International Search Report, dated Feb. 12, 2014, from corresponding PCT application.

* cited by examiner

SYSTEM AND METHOD FOR MONITORING AT LEAST ONE OBSERVATION AREA

INTRODUCTION

The present invention comprises a system and a method for monitoring at least one observation area, and more specifically a system and method for improved monitoring by combining panorama pictures with real time video from the observation area that is to be monitored.

BACKGROUND

Different methods and systems for monitoring and detection of different incidents are well known. These comprise use of different types of surveillance cameras for capturing visual information from an area to be monitored.

Use of line scanner for providing a panoramic picture is known. Use of a panoramic and tilting controlled camera is also known.

Existing monitoring installations utilize information from different camera systems separately in operation rooms. Normally this call for use of several operators or that one operator is moving the focus to the different monitoring systems for updating an overview of the situation.

The advantage of the present invention is combining use of different camera technologies and capturing, processing and coordinating of signals from these.

The invention is new and inventive in that it enables use of simultaneous access to accessible data from different camera systems and sensors. Data representation can thus be realized on only one monitoring device. This will simplify the daily routine for each operator substantially and the number of operators can thus in most cases be reduced.

The invention realizes a flexible system for monitoring and it enables a very realistic visual presentation of one or more observation areas even if available band width for transferring data with information is restricted.

There are a variety of areas of application of the invention comprising, but not limited to stationary and mobile air-, sea- and ground-based locations, for instance mounted on helicopters, ships and ground-based vehicles, for monitoring of ports, Air Traffic Control, bases, borders, drilling platforms, video conferences, and other places where one wants a feeling of being present at a location even if one is located at a distant location. Type of use of the invention may comprise monitoring, controlling, observing, simulating and training.

The fact that an operator can operate one or several observation areas from a distant location in a safe environment contributes to increased quality and safety at the workplace of the operator.

SHORT DESCRIPTION OF THE INVENTION

The present invention comprises a system for monitoring at least one observation area.

The system comprises at least a first camera for providing panorama pictures of the said at least one area, where the camera is provided on a rotating platform in the at least one area that is to be monitored and where the rotating platform comprises a rotation independent transmission device in the shape of a contact or wireless slip ring (in electrical engineering terms) for transferring data from the at least one first camera;

The system further comprises at least a second camera for providing real time video and which is provided on a stationary platform in the at least one area that is to be monitored;

A processing device is further connected to said cameras for capturing, processing and coordinating of signals.

Further features of the system are described in the independent claims.

The invention further comprises a method for monitoring of at least one observation area such as defined in the claims.

DETAILED DESCRIPTION OF THE INVENTION

The invention will now be described with reference to figures where:

Figure 1:
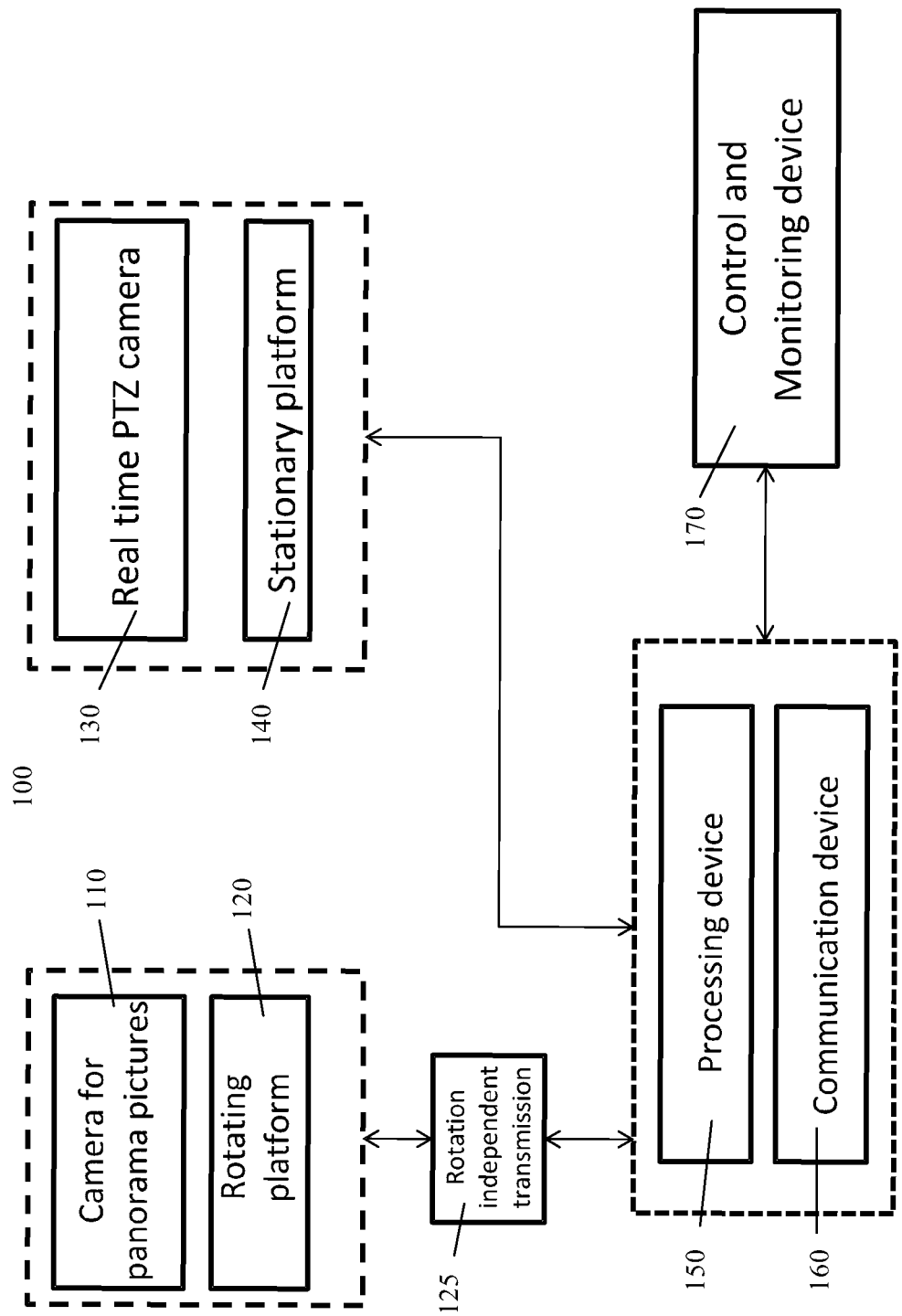
FIG. 1 shows an overview of the system comprised in the invention.

FIG. 1 shows an overview of the components comprised in the system 100 for monitoring according to the invention. The system can be described as a hybrid monitoring system since it comprises different camera solutions where one type of camera is arranged on a rotating platform 120, while another type of camera is arranged on a stationary platform 140. Data from the different camera is captured, processed and coordinated by means of a processing device 150.

For simplicity use of only one camera placed on each of the rotating and stationary platforms 120, 140 respectively is described in the following. One observation area is further described even if the system 100 can handle several observation areas.

A first camera 110 for providing panorama pictures of an observation area is arranged on a rotating platform 120 in the area to be monitored.

According to one embodiment of the invention the first camera 110 providing panorama pictures is a vertical line scanning camera with corresponding optics and electronics mounted on the rotating platform 120. By performing a full rotation on the rotating platform 120 the camera will capture a 360-degrees panorama picture. Line scanning technology can provide uniform color/black & white representation with high resolution corresponding to the human eye, i.e. 0.2-0.3 mrad, which is preferable in many areas of application.

Line scanners used in the system 100 can be of the same type or based on different technology and mounted on the platform with an angular separation depending of function. It may further be tiltable for covering the full hemisphere in the observation area.

The picture sensor in a line scanner is a collection of vertical sensor lines collecting, for instance, but not restricted to, visual light, in spectral band (color) and/or IR and/or UV.

Line scanning can be realized in that the sensor pixel matrix is processed together to a vertical line with pixels for improving the signal/noise ratio. The technique is called TDI (Time Delay Integration). By inserting a filter or a prism that is splitting the light into several spectral bands (i.e. colors) and having a TDI per spectral band each single spectral band can be detected. With this technique a color camera for RGB having increased light sensitivity can easily be realized. This will in turn permit increased scanning rate.

A suitable combination of the different sensor types will ensure the best possible situational awareness and situation overview over an observation area both night and day as well as during conditions with reduced visibility as a result of for example fog or dust. A scene from an observation area can be reproduced in black/white or color.

In one embodiment of the invention there is, in parallel with the line scanning picture sensor, a rotating laser emitting and laser scanning sensor system generating a 3D-range picture of the area to be monitored.

In combination with the said line scanning camera there is at least one other operating camera 130 that is arranged on a stationary platform 140 for generating real time video. This is a PTZ-camera. This means that direction and segment/detail of real time video to be displayed is controlled by PTZ instructions. For giving this function to the camera the stationary platform can be made of a two-axis platform that is controlled with PTZ instructions for giving a camera that is mounted onto its said pan-tilt function. Alternatively the camera house itself that is used may have these functions built-in. Cameras are sending real time video of a segment of the said 360-degrees panoramic still picture that is active.

In one embodiment the video signal from the PTZ-camera is displayed in a dedicated display system or as a picture enclosed in said 360-degrees panoramic picture, i.e. with picture-in-picture functionality (PIP). The resolution of the PTZ-camera used is preferably corresponding to the one the line scanning camera is operating with. If required, a larger part of the scene can be displayed with real time video at the cost of the resolution of the video camera. A PTZ camera can also comprise several staring cameras that are lined up between each other. In this way a larger sector of the panoramic picture can be presented as real time video without reducing resolution.

In one embodiment a range finder is arranged with an aiming axis that is parallel with optical axis of the other camera 130 that is providing real time video.

The other camera 130 that is used for providing real time video may, analogous as the camera providing still picture, have a picture sensor that is operating in visible spectral band (color) and/or IR and/or UV.

The cameras and the collection of sensors that are placed in one or several observation areas are adapted for operation in all environments such that they can tolerate different conditions with regards to, among other factors, temperature, wind, dust, rain, and other factors that may reduce the performance of the sensor collection.

The system 100 can further comprise sensors for monitoring different ambient parameters. Such are then arranged on the stationary platform 140.

In one embodiment the system 100 further comprises a collection of microphones arranged on the stationary part 140, and where these are connected to said processor device 150 such that real time video from the area to be displayed can be based on the direction of recorded sound. The sound picture from the scene can also be reproduced for the operator synchronous with the picture for increased situational awareness. This signal is presented for the operator via a number of speakers 176 such that sound and picture from the scene is reproduced like it is at the recording site.

The system 100 may further comprise a radar system which is arranged on said stationary part 140 for identifying objects, their position and velocity, when sight and visual information are bad. The radar system can also be mounted on a rotating part, where it is synchronized with the panoramic pictures.

The rotating platform 120 comprises a positioning system ensuring reproduction of a complete panoramic picture for each rotation. The rotating platform 120 further comprises a rotation independent transmission 125 in the shape of a contact or wireless slip ring for transferring data from the panoramic camera. Processing of captured data can be executed in all elements in the assembly for reducing the amount of data where there is need for this.

The panorama pictures can be displayed on an external monitoring system and will be updated in line with the rotation speed of the rotating platform 120. New information can be displayed either line wise, section wise as new information is captured, or down to one time for each lap where a complete new panorama picture is displayed for the operator 180.

The chassis that is used for the cameras in the observation area is preferably made of a type ensuring stability for generating stable pictures during dynamic conditions occurring in different operation areas. In one embodiment the chassis is therefor a stabilization platform that the rotating platform 120 is connected to.

When the system 100 is operational it will generate large amounts of data that will have to be processed and handled before transmission to a location for remote monitoring, which comprises a control- and monitoring device 170 for controlling of the monitoring system as well as displaying of data from the sensors, for instance panorama pictures and real time video from at least one observation area.

For transmitting monitoring data the system 100 comprises a communication device 160 connected to the processing device such that processed and coordinated signals are transferred to a location for remote monitoring of the at lest one observation area.

Processing of data and image processing may include, but is not restricted to, data compression and image differentiation. Reduction of the amount of data transmitted can be achieved by only sending new/changed information in succeeding pictures. The degree of compression may be adjusted to accessible band width.

Information is transmitted via a suitable communication medium as for instance, but not restricted to, dedicated lines (fiber, copper), wireless (Wi-Fi, Internet, optical) and where distance is indefinite.

In one embodiment the system 100 may also comprise communication via at least one acoustic or optic transducer.

Figure 2:
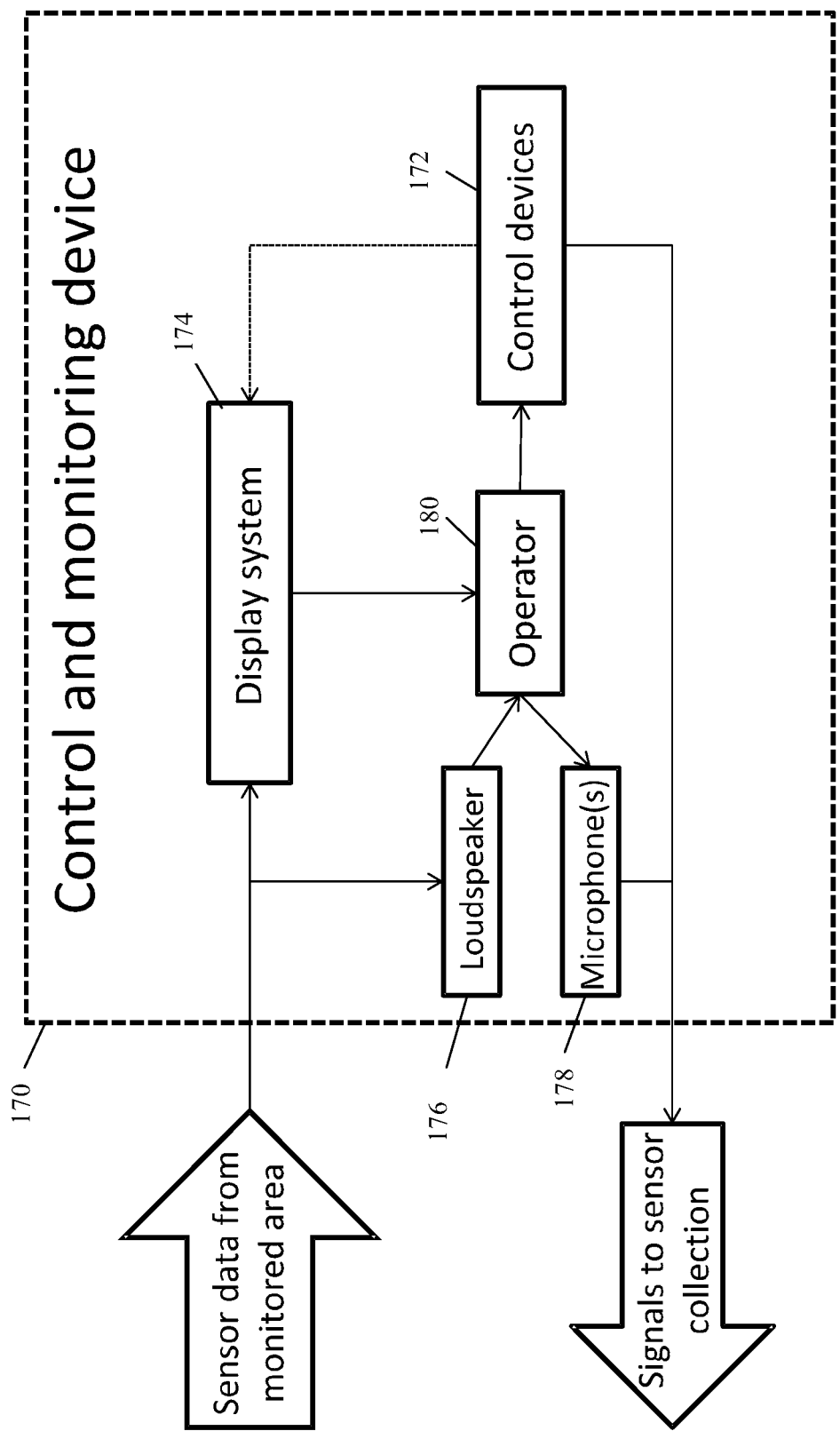
FIG. 2 shows details of the control- and monitoring device.

FIG. 2 shows details of the control and monitoring device 170 with a display system 174 for the monitoring located preferably at a location where an operator 180 can control the system 100 in a safe environment. The system 100 may display the whole or part of said 360-degree picture, with a resolution up to, but not restricted to said resolution of the eye. If smaller sectors are displayed one may pan in the still pictures via a user interface. The monitoring system may comprise, but is not limited to variations of monitors, projectors for front or back projection, OLED wallpaper, display glasses, a helmet mounted display or a form of combination for these. For a more realistic presentation, the picture is presented at a sphere shaped seamless screen or display.

The part of the scene that is displayed in real-time video is defined by an operator 180 via a command given via a user interface. This may, but is not restricted to hand gestures, control grip, eye tracking, head tracking and/or virtual binocular. An example of the last mentioned can be a hand held device with a pointing function and integrated displays together with zoom/focus adjustment. When the operator 180 finds an object of interest in the field of view of a PTZ-camera the object can be tracked automatically by the said PTZ-camera and if the real-time presentation is displayed as a picture in the panorama picture the said picture in the panorama picture will move with the object of interest relative to the panorama picture. If several PTZ-cameras are accessible more objects can be tracked at the same time in real-time. The operator 180 also has the possibility to control the PTZ-camera to follow a predetermined track.

In order to increase the performance of the camera on the rotating platform further image processing is used for making the use easier, increase the observability or making the picture as identical as a real scene as possible. Examples are improvements of contrast, super resolution, HDR picture generation and hand gesture detection.

In addition to picture-in-picture functionality the system 100 may display other information as an overlay, in dedicated windows, or on dedicated display systems. Examples of information can be temperature and weather data, information captured by dedicated sensors mounted on the platform. Radar information may also be integrated with the panorama picture or presented on a dedicated display system. The system 100 can be delivered with an adapted radar system, as an example a Doppler radar, or utilization of existing, available radar systems. Information about known stationary or movable elements in the scene can also be included in the display system.

The captured sound signal can be presented for the operator 180 via a number of loudspeakers 176 such that sound and picture from the scene is recreated with same relations as at the capturing site.

In addition to video and still pictures the system 100 can perform continuous range measurements from the position of the system 100 to an object of interest. The distance is presented in a desired denotation as overlay or in dedicated windows. In parallel with cameras on the rotating platform a laser system can generate a 3D-range picture of the scene that is monitored.

In one embodiment of the system the operator 180 has the option to communicate via microphones 178 by means of sound—and light signals via the sensor system from its external location. The external location where the control- and monitoring device 170 is located, also comprises in one embodiment of the invention a set of acoustic transducers, in addition to one or more display systems as well as said user interface that is operated via said hand gestures and/or a control panel. The use of a standardized user interface enabling that the operator 180 can have a sort of training for operating several remote located monitoring posts.

Figure 3:
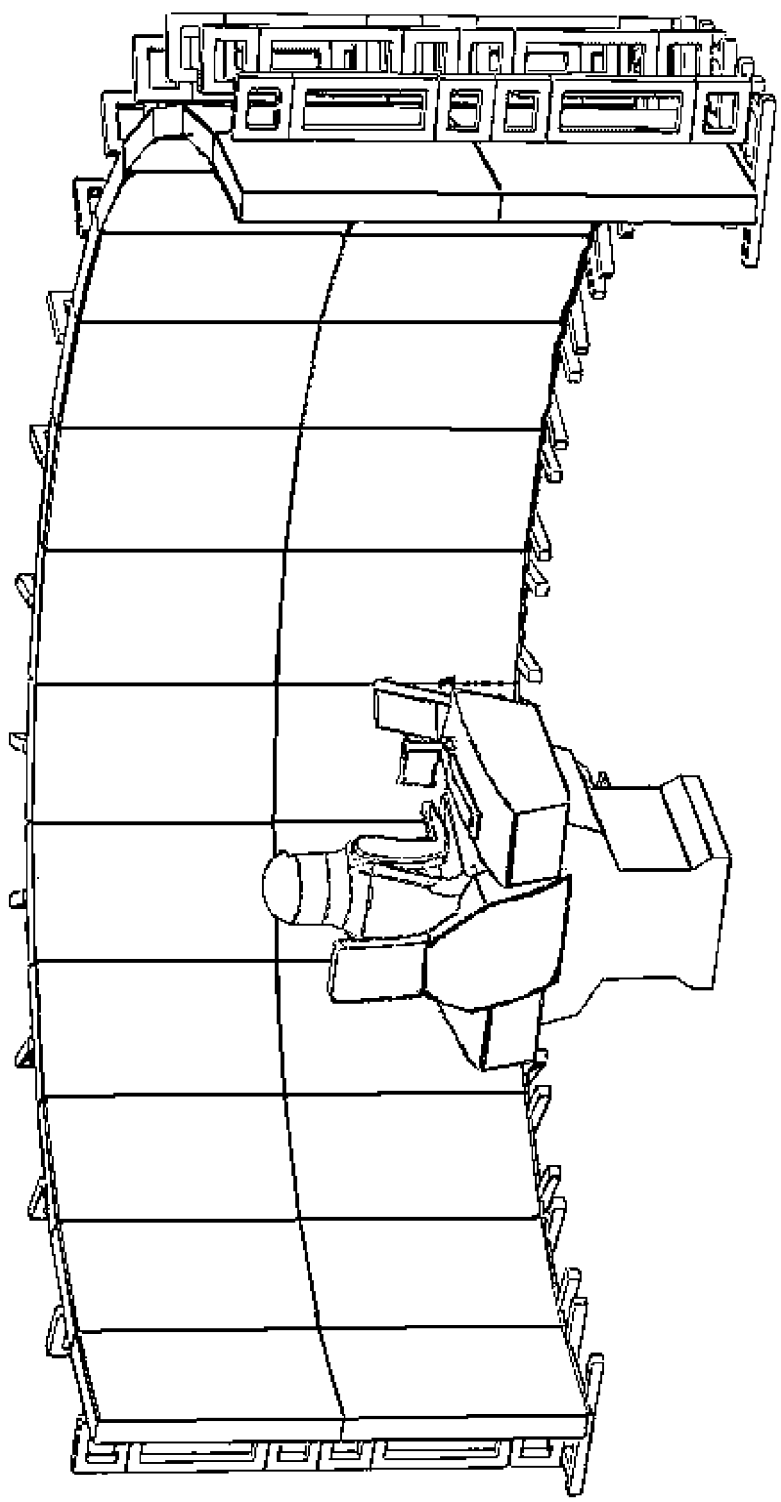
FIG. 3 shows an example of a location where monitoring can be controlled.

FIG. 3 shows an example of a location where monitoring is controlled from. In the figure a plurality of displays or monitors are connected in a curved configuration in front of an operator 180 such that the observation area that is monitored cover the complete field of view of the operator 180. The figure shows a visual angle of about 180°, but by expanding this with more monitors 360° can be realized.

In another embodiment the visual information from an observation area can be displayed for an operator 180 that is equipped with a helmet with a mounted display or that is using display glasses.

Displaying of one or more observation areas can also be realized on a screen or similar by using front- or back projection.

3D-presentation can also be realized if it at the observation area is generated a 3D-range picture of the scene to be monitored. If two or more sensors assemblies are connected to the same display system, two and two signals can be displayed with different polarization (same technology as 3D-glasses) where two operators 180 have glasses and headsets that are filtering out one polarization. In this way two operators 180 can monitor two sites at the same time from the same control room, without loss of field of view, resolution or observation ability. By using lower resolution or field of view two observation areas can be presented for an operator 180 on the same display system, either above/below or in each of its sector.

From its location an operator 180 will be able to control information that is selected to be displayed for further viewing by means of different control means as for instance, hand gestures, tracking of head- and/or eye position, a touch sensitive screen, virtual binocular, verbal commands and other known controlling means.

What is to be displayed in real time video by means of the said at least one other camera 130 from the observation area the system can control totally automatically based on interpretation of detected movements, sound and light from the observation area. An operator 180 can however override one or more of these and may control the whole system manually based on own sight- and aural impressions.

The present invention which is described above as a system 100 also comprises a method for monitoring at least one observation area. The method comprises several steps, where the first step is providing panorama pictures of the said at least one area by means of at least a first camera 110 arranged on a rotating platform 120 in the at least one area to be monitored.

The second step is providing real time video from the at least one area by means of at least a second camera 130 arranged on a stationary platform 140 in the at least one area that is to be monitored.

The last step is capturing, processing and coordinating received signals from said cameras by means of a processing device 150 providing processed and coordinated signals.

Further features of the method are described in the claims and the meaning of these will be understood in view of the detailed description of the system.

The invention will be able to replace and centralize several different types of monitoring, controlling, observation, searching, simulating and practicing both at sea, in the air and onshore, for civil and military use.

Examples of areas of application at sea are oil platforms and ship mounted implementations. The last mentioned may be a cruise ship, pipe lay vessel, ice breaker and similar.

Areas of applications in air may for instance be implementations of the invention in a helicopter and drones or unmanned aircrafts, whereas onshore it may be in connection with air traffic control, anti-terror, border areas, monitoring of harbors, and monitoring of scrap heap.

The invention is also suited for being implemented in connection with a video conference or tourism as for instance a 'World Wide Virtual Tourist Center' or other areas of applications where presence at a distant location is desirable.

The invention claimed is:

1. System (100) for monitoring at least one observation area, comprising:
    at least a first line scanning camera (110) for providing high resolution panorama pictures of the said at least one area, where the line scanning camera (110) is arranged on a rotating platform (120) in the at least one area that is to be monitored and where the rotating platform (120) comprises a rotation independent transmission device (125) in the shape of a contact or wireless slip ring for transferring data from the at least one first line scanning camera (110);
    at least a second camera (130) for providing real time video and which is provided on a stationary platform (140) in the at least one area that is to be monitored; and a processing device (150) connected to said first and second cameras (110, 130) for capturing, processing and coordinating of signals from the first and second cameras and for compressing image data according to an accessible band width.

2. System (100) according to claim 1, wherein the at least one first line scanning camera (110) arranged on the rotating platform (120) uses TDI (Time Delay Integration).

3. System (100) according to claim 1, wherein the at least one second camera (130) for providing real time video has digital Pan/Tilt/Zoom (PTZ) functionality and where direction and segment of real time video to be displayed is controlled by PTZ instructions.

4. System (100) according to claim 1 wherein the first and second cameras (110, 130) each have a picture sensor operating in visual spectral band (color) and/or IR and/or UV.

5. System (100) according to claim 1, further comprising a communication device (160) connected to said processing device (150) for transferring processed coordinated signals to a location for controlling and monitoring of the at least one observation area.

6. System (100) according to claim 5, wherein the system (100) at the location for remote monitoring comprises a control and monitoring device (170) and a display system (174) for selective controlling and displaying of real time video from the at least one observation area.

7. System (100) according to claim 6, wherein said control and monitoring device (170) includes control devices (172) used for controlling the system (100).

8. System (100) according to claim 5, wherein the communication device (160) is arranged on the stationary platform (140) and comprises at least one acoustic transducer for acoustic communication and/or at least one optical transducer for optical communication.

9. System (100) according to claim 1, further comprising a range measuring device having an aiming axis parallel with an optical axis of the at least one second camera(130).

10. System (100) according to claim 1, further comprising sensors for monitoring surrounding parameters, and where these are arranged on the stationary platform (140).

11. System (100) according to claim 1 further comprising a further collection of microphones arranged on the stationary platform (140), and said microphones are connected to said processing device (150) such that the segment from the area to be displayed is based on the direction of captured sound.

12. System (100) according to claim 1, further comprising a radar system arranged on said rotating and/or stationary platform (120, 140).

13. System (100) according to claim 1, wherein the rotating platform (120) is connected to a stabilization platform.

14. System (100) according to claim 1, wherein in parallel with the said at least one first line scanning camera (110) there is a laser system generating a 3D-range picture of the area monitored.

15. System according to claim 1, wherein the first line scanning camera has a resolution of 0.2 to 0.3 mrad.

16. Method for monitoring at least one observation area, comprising the steps of:
  a. providing high resolution panorama pictures of the said at least one area by means of at least a first line scanning camera (110) arranged on a rotating platform (120) in the at least one area to be monitored, and where the rotating platform (120) comprises a rotation independent transmission device (125) in the shape of a contact or wireless slip ring for transferring data from the at least one first line scanning camera (110);
  b. providing real time video from the at least one area by means of at least a second camera (130) arranged on a stationary platform (140) in the at least one area that is to be monitored; and
  c. capturing, processing and coordinating received signals from said first and second cameras by means of a processing device (150) providing processed and coordinated signals from the first and second cameras, the processing device compressing image data according to an accessible band width.

17. Method according to claim 16, wherein the at least one first line scanning camera (110) arranged on the rotating platform (120) employs TDI (Time Delay Integration).

18. Method according to claim 16, wherein only changes in a picture taken from identical position are collected for minimizing the amount of data.

19. Method according to claim 16, wherein a Pan/Tilt/Zoom (PTZ) camera is used for providing real time video, and the orientation and field of view of real time video is controlled by PTZ instructions.

20. Method according to claim 16, wherein the first and second cameras operate in the visual spectral band (color) and/or IR and/or W.

21. Method according to claim 16, wherein said processed and coordinated signals are transferred to a location for remote monitoring of the at least one observation area, and the transmission is performed via a communication device (160) connected to said processing device (150).

22. Method according to claim 16, further comprising using a control and monitoring device (170) at the location for remote monitoring for controlling the system (100) for monitoring and displaying of panoramic pictures and real time video from the at least one observation area.

23. Method according to claim 22, further comprising using control devices (172) comprised in said control and monitoring device (170) for controlling the system (100).

24. Method according to claim 16, wherein the communication device (160) that is arranged on the stationary platform (140) communicates by using at least one acoustic transducer for acoustic communication and/or at least one optical transducer for optical communication.

25. Method according to claim 16, further comprising using a range measuring device having an aiming axis parallel with an optical axis of the least one second camera (130).

26. Method according to claim 16, further comprising using a collection of acoustic transducers arranged on the stationary platform (140), and where these are connected to said processing device (150) such that the area to be displayed is based on the direction of captured sound.

27. Method according to claim 16, further comprising using a radar system arranged on the rotating and/or stationary platform (120, 140).

28. Method according to claim 16, wherein the first line scanning camera has a resolution of 0.2 to 0.3 mrad.

* * * * *